United States Patent
Sourour et al.

(10) Patent No.: US 7,133,353 B2
(45) Date of Patent: Nov. 7, 2006

(54) CDMA SYSTEM USING QUASI-ORTHOGONAL CODES

(75) Inventors: Essam Sourour, Cary, NC (US); Roozbeh Atarius, Cary, NC (US); Ali Khayrallah, Apex, NC (US)

(73) Assignee: Telefonaktiebolaget LM Ericsson (Publ) (SE)

(*) Notice: Subject to any disclaimer, the term of this patent is extended or adjusted under 35 U.S.C. 154(b) by 1085 days.

(21) Appl. No.: 09/756,503

(22) Filed: Jan. 8, 2001

(65) Prior Publication Data

US 2002/0089950 A1 Jul. 11, 2002

(51) Int. Cl.
*H04J 11/00* (2006.01)
*H04B 7/216* (2006.01)

(52) U.S. Cl. .............. 370/208; 370/203; 370/320; 370/335; 370/342

(58) Field of Classification Search ......... 370/209, 370/203, 208, 320, 335, 342; 455/441
See application file for complete search history.

(56) References Cited

U.S. PATENT DOCUMENTS

| | | | | |
|---|---|---|---|---|
| 6,163,524 A | * | 12/2000 | Magnusson et al. | 370/208 |
| 6,198,734 B1 | * | 3/2001 | Edwards et al. | 370/347 |
| 6,275,486 B1 | * | 8/2001 | Edwards et al. | 370/347 |
| 6,347,091 B1 | * | 2/2002 | Wallentin et al. | 370/437 |
| 6,377,813 B1 | * | 4/2002 | Kansakoski et al. | 455/522 |
| 6,477,157 B1 | * | 11/2002 | Kim et al. | 370/331 |
| 6,496,497 B1 | * | 12/2002 | Lee et al. | 370/342 |
| 6,504,832 B1 | * | 1/2003 | Koo et al. | 370/342 |
| 6,512,753 B1 | * | 1/2003 | Kim et al. | 370/335 |
| 6,741,550 B1 | * | 5/2004 | Shin | 370/209 |
| 6,747,994 B1 | * | 6/2004 | Oses et al. | 370/468 |
| 6,973,063 B1 | * | 12/2005 | Sourour | 370/335 |
| 6,973,316 B1 | * | 12/2005 | Hayakawa | 455/456.1 |

FOREIGN PATENT DOCUMENTS

| | | |
|---|---|---|
| DE | 19843664 A1 | 4/1998 |
| DE | 19843664 A | 4/1999 |
| EP | 0809373 A | 11/1997 |
| EP | 0809373 A2 | 11/1997 |
| WO | WO99/12278 | 3/1999 |
| WO | WO 9912275 A | 3/1999 |
| WO | WO00/30390 | 5/2000 |
| WO | WO 0030390 A | 5/2000 |
| WO | WO00/70805 | 11/2000 |
| WO | WO 0070805 A | 11/2000 |

\* cited by examiner

*Primary Examiner*—Huy D. Vu
*Assistant Examiner*—Blanche Wong
(74) *Attorney, Agent, or Firm*—Coats & Bennett, P.L.L.C.

(57) ABSTRACT

A CDMA communication system uses a set of quasi-orthogonal codes to supplement the standard set of Walsh codes used in conventional systems. Users are assigned a code selected from the set of Walsh codes, if available. If the number of users exceeds the number of available Walsh codes, selected users are assigned to quasi-orthogonal codes. The users assigned quasi-orthogonal codes are chosen based on user mobility.

23 Claims, 4 Drawing Sheets

CDMA SYSTEM USING QUASI-ORTHOGONAL CODES

BACKGROUND OF THE INVENTION

The present invention relates generally to Code Division Multiple Access systems and, more particularly, to power control methods useful in Code Division Multiple Access systems.

Numerous access schemes exist to allow multiple users to share a communication medium. One such access scheme is known as Code Division Multiple Access (CDMA). CDMA is a form of multiple access employed by spread-spectrum communication systems. In CDMA systems, a wideband spreading signal is used to convert a narrowband data sequence to a wideband signal. The spreading signal typically comprises a pseudo noise (PN) sequence that has a chip rate several orders of magnitude higher than the data rate of the data sequence. The resulting wideband signal occupies a bandwidth in excess of the minimum bandwidth required to transmit the data sequence.

One spread spectrum technique employed in CDMA systems is known as direct sequence spread spectrum. In direct sequence spread spectrum systems, the data sequence modulates a PN sequence, which serves as the spreading signal, to generate a wideband signal. Modulation may be achieved, for example, by applying the data sequence and PN sequence to a product modulator or multiplier. Multiplication of two signals produces a signal whose spectrum equals the convolution of the spectra of the component signals. If the data sequence is narrowband and the PN sequence is wideband, the product of the data sequence and PN sequence is a wideband signal whose spectrum is nearly equal to the spectrum of the PN signal. Thus, the PN sequence functions as a spreading signal.

In CDMA systems, multiple users may use the same carrier frequency and may transmit simultaneously. Each user has its own PN sequence which is approximately orthogonal to the PN sequences of other users. Transmissions to or from individual users are imprinted with that user's PN sequence. The receiver selects the desired signal, which combines in the communication channel with unwanted signals, by performing a correlation operation. That is, the receiver correlates the received signal with the PN sequence of the desired signal. All other signals are spread by the PN sequence and appear as noise to the receiver.

Power control is used on the reverse link in CDMA systems to control the power of signals received at the base station. The purpose of power control is to assure that each mobile terminal served by a particular base station provides approximately the same signal level to the base station receiver. In CDMA systems, the system capacity is maximized if each mobile transmitter power level is controlled so that its signal arrives at the base station receiver with the minimum required signal-to-interference ratio (SIR).

The current standard for CDMA systems in the United States is contained in a specification published by the Telecommunications Industry Association and Electronics Industry Association (TIA/EIA) as IS-95. New standards for wideband CDMA are currently being developed in North America, Europe, and Japan, which offer significant performance improvements compared to the current CDMA standard. One of the new features that contributes to the improved performance of wideband CDMA is fast forward link power control (FFLPC). FFLPC combats Rayleigh fading in the forward link propagation channel at slow user mobility. Power control for fast user mobility is not easily achievable within the current CDMA standards.

In the new CDMA standards, forward link power control is implemented by the base station with the aid of the mobile terminal. The base station commands the mobile terminal to maintain a predetermined signal quality standard, such as a specified frame error rate (FER). The mobile terminal maps the target FER into a target signal-to-interference ratio (SIR) that is required to achieve the target FER. The mobile station estimates the SIR continuously and sends power control bits to the base station multiplexed into the reverse pilot channel. If the measured SIR is below the target SIR, the mobile station sends a power control bit (PCB) with a value of +1 to request an increase in its transmit power. If the measured SIR is above the target SIR, the mobile terminal sends a PCB with a value of −1 to request a decrease in its transmit power. In response, the base station may increase or decrease its transmit power on the forward traffic channel assigned to the mobile terminal by a value $\Delta P$. The base station operates at the new power level for a period of time T until it receives a new power control bit from the mobile terminal. Normally, the time T is the duration of one power control group (PCG). Each forward traffic channel frame, which has a duration of 20 milliseconds, consists of sixteen PCGs, each with a duration of 1.25 milliseconds. A PCB is transmitted during each PCG so that a total of sixteen PCBs are transmitted in a frame.

Another new feature in the emerging American standard for wideband CDMA, which does not exist in the emerging European standard, is the introduction of quasi-orthogonal codes (QOCs). Under the current American standard for CDMA, when a mobile terminal makes a connection, it is assigned one code chosen from a set of 64 Walsh codes to use during the call. Walsh codes are orthogonal when they are synchronous. Hence, if there is no multipath in the propagation channel, the forward traffic channels from the base station to all users in the cell are orthogonal, and users in the same cell do not cause interference with each other.

The current CDMA standard is used primarily for voice communications. The new CDMA standard is geared more toward high data rate and multimedia applications. Under the new standard, a single user can simultaneously receive many data streams corresponding to many services, such as voice, video, internet, fax, etc. To provide all these data streams, the new American CDMA standard allows the cellular system to assign up to three codes, corresponding to three forward traffic channels, to the same user. With the increasing demand for cellular services, the number of users is expected to rise. Thus, the new CDMA standard needs more codes than is provided by the standard set of 64 Walsh codes to satisfy the increased number of users and the expected increase in the number of simultaneous codes per user. To meet this demand, the new CDMA standard has added a set of quasi-orthogonal codes. These code sets have the characteristic that codes in the same set are orthogonal. However, two codes from different sets are not orthogonal and, when used together in the same cell, cause interference with each other.

BRIEF SUMMARY OF THE INVENTION

The present invention relates to a CDMA communication system that employs a set of quasi-orthogonal codes to supplement the set of standard Walsh codes. In general, users are assigned one or more spreading codes selected from the set of Walsh codes, if available. If no Walsh codes are available, selected users are assigned quasi-orthogonal codes.

Quasi-orthogonal codes users will generally experience greater performance degradation than Walsh code users, and the present invention attempts to mitigate this performance difference by assigning users with low mobility to quasi-orthogonal codes. When user mobility is low, the mobile terminal can compensate for performance degradation by implementing fast forward power control. User mobility may be determined, for example, by measuring the Doppler shift of a channel used by a particular user. A channel with a high Doppler frequency would indicate a correspondingly high mobility relative to the base station. Conversely, a channel with a low Doppler frequency would indicate a correspondingly low mobility relative to the base station.

When a user requests access to a network when all available Walsh codes are already assigned, the network determines the user's mobility by measuring the Doppler frequency of the channel used by that particular user. If the user requesting access is a low mobility user, that user may be assigned a quasi-orthogonal code. On the other hand, if the user requesting access is a high mobility user, the network may make a Walsh code available for that user by re-assigning a low mobility Walsh code user to a quasi-orthogonal code and assigning the new high mobility user to the newly available Walsh code. The network may continually re-assign users as channels become available or user mobility changes.

DETAILED DESCRIPTION OF THE INVENTION

The present invention is related to CDMA systems that employ quasi-orthogonal codes, such as cdma2000. In conventional CDMA systems a set of codes called Walsh codes, are used as spreading codes. There are a total of 64 Walsh codes, which limits the number of users. In the cdma2000 standard, when all Walsh codes are assigned, additional users may be assigned a code from a set of quasi-orthogonal codes. Like Walsh codes, all codes in the set of quasi-orthogonal codes are orthogonal. However, the quasi-orthogonal codes are not orthogonal to the set of Walsh codes. Thus, use of quasi-orthogonal codes tends to increase interference.

In general, the quasi-orthogonal code users will be outnumbered by Walsh code users. The relatively few users of quasi-orthogonal codes will, therefore, experience relatively high interference from the larger number of Walsh code users. The Walsh code users will receive less interference from the smaller number of quasi-orthogonal code users. Thus, the quasi-orthogonal code users will experience greater degradation in performance than the Walsh code users.

Fast forward link power control may be used to mitigate the performance difference between Walsh code users and quasi-orthogonal code users. Fast forward link power control, in general, is most effective when user mobility is low and is less effective when user mobility is high. According to the present invention, when the number of users exceeds the number of available Walsh codes, selected users with low mobility are assigned to quasi-orthogonal codes. Thus, the present invention seeks to minimize the performance difference by assigning low mobility users who will benefit most from fast forward power control to quasi-orthogonal codes.

Figure 1:
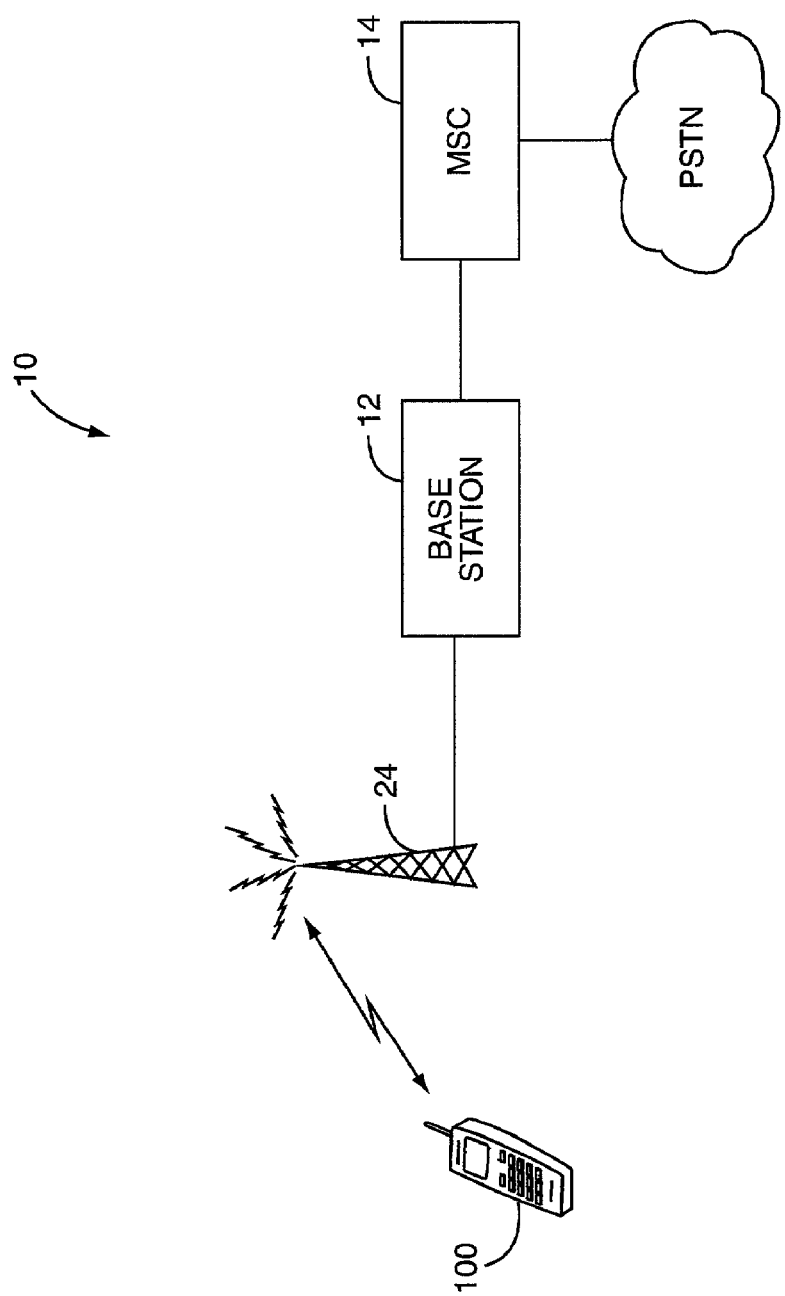
FIG. 1 is a functional block diagram of a wireless communication network implementing the forward link power control method of the present invention.

Referring now to FIG. 1, a wireless communications network 10 supports over-the-air communications between mobile terminals 100 and stationary receivers generally known as base stations 12. Base stations 12 connect via one or more mobile switching centers (MSC) 14 to external wireline networks such as the Public Switched Telephone Network (PSTN), the Integrated Services Digital Network (ISDN), and/or the Internet. Each base station 12 is located in and provides wireless communication services to a geographic region referred to as a cell. In general, there is one base station 12 for each cell within a given wireless communications network 10. Within each cell, there may be a plurality of mobile terminals 100 that communicate via a radio link with a serving base station 12. The base station 12 allows the user of the mobile terminals 100 to communicate with other mobile terminals 100, or with users connected to the external network. The MSC 14 routes calls to and from the mobile terminal 100 through the appropriate base station 12 or gateway, i.e., interface between a MSC 14 and external network.

Figure 2:
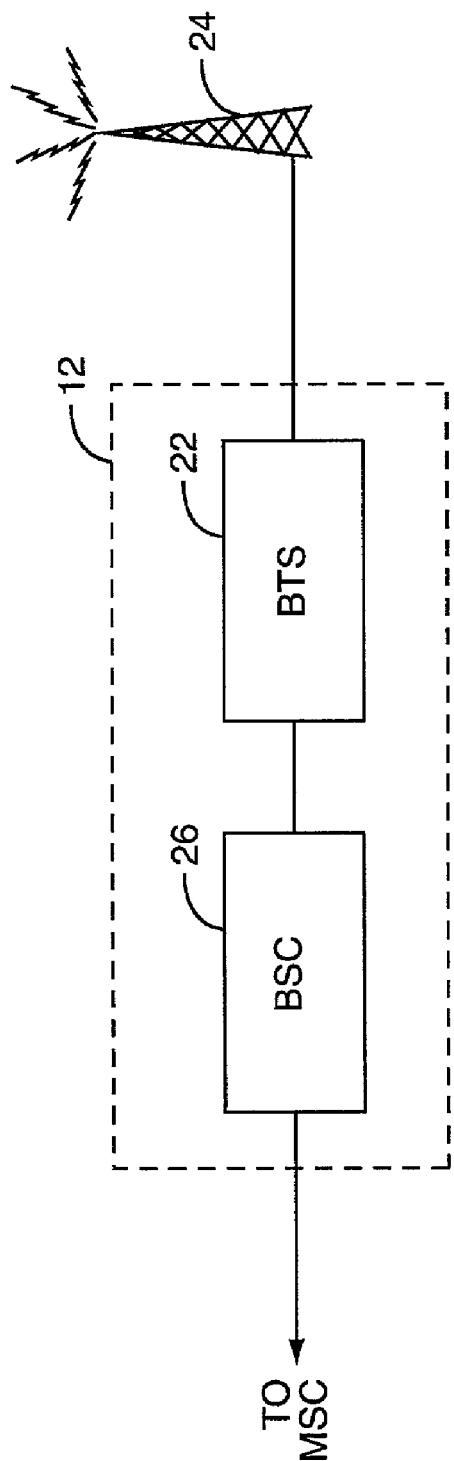
FIG. 2 is a functional block diagram of a base station in a wireless communication network.

FIG. 2 is a functional block diagram of a base station 12. Base station 12 comprises a base transceiver system (BTS) 22 and a base station controller (BSC) 24. BTS 22 typically comprises a plurality of transceivers 22 coupled to antenna 24 for communicating with mobile terminals 100. BSC 26 provides management and control functions for the BTS 22. BSC 26 exchanges messages with both the BTS 22 and MSC 14. Some messages may pass transparently through the BSC 26. One of the functions performed by the BSC 26 is assigning channels or spreading codes to mobile terminal users requesting access to the network. The manner in which such assignments are made will be described in greater detail below.

Figure 3:
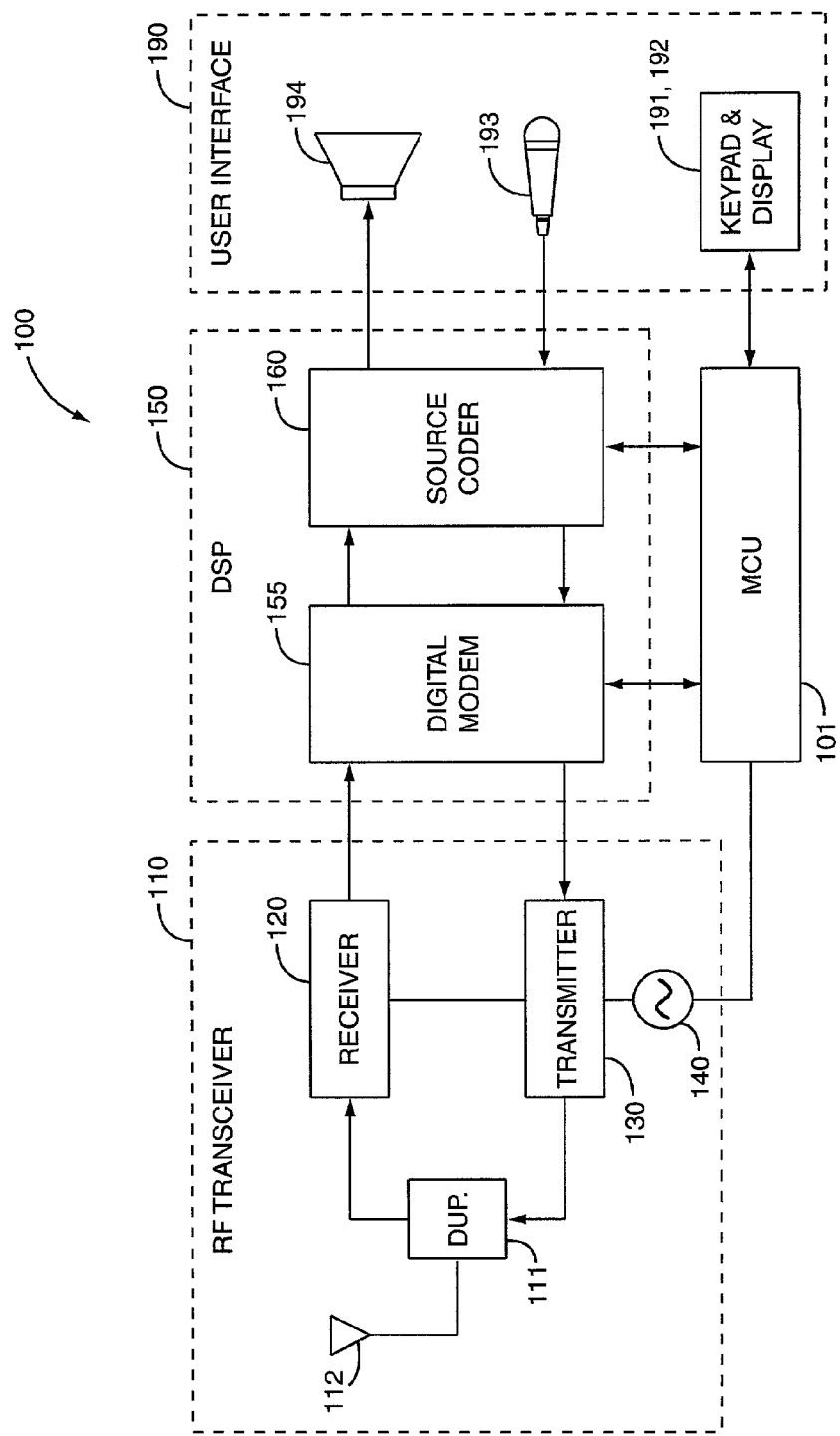
FIG. 3 is a functional block diagram of a mobile terminal in the mobile communication network of FIG. 1 implementing the forward link power control method of the present invention.

FIG. 3 is a block diagram of a mobile terminal 100. The term mobile terminal 100 as used herein includes a cellular radiotelephone; a Personal Communications System (PCS) terminal that may combine a cellular radiotelephone with data processing, facsimile and data communications capabilities; a Personal Digital Assistant (PDA) that can include a radiotelephone, pager, Internet/intranet access, Web browser, organizer, calendar; a conventional laptop and/or palmtop computer equipped with a radiotelephone transceiver, or other appliance that includes a radiotelephone transceiver. Mobile terminals 100 may also be referred to as "pervasive computing" devices.

Mobile terminal 100 comprises a microcontroller unit (MCU) 101, an RF transceiver 110, a digital signal processor (DSP) 150, and a user interface 190. Mobile terminal 100 may additionally include an external interface for communication with a computer, local area network, or other device.

RF transceiver 110 establishes a link for wireless communications with the base station 12. RF transceiver 110 comprises a receiver 120, transmitter 130, frequency synthesizer 140, duplexer 111, and antenna 112. Receiver 120 receives downlink or forward link communications from the base station 12. Receiver 120 amplifies and downconverts received signals to the baseband frequency of the DSP 150. Signals converted by receiver 120 to the baseband frequency are referred to herein as baseband signals. Transmitter 130 sends uplink or reverse link communications to the base station 12. Transmitter 130 receives baseband signals from the DSP 150, which the transmitter 130 amplifies and uses to modulate an RF carrier at a directed power level. Frequency synthesizer 140 provides the reference signals used for frequency translation in the receiver 120 and transmitter 130.

Receiver 120 and transmitter 130 are coupled to antenna 112 by duplexer 111. Duplexer 111 typically includes a duplex filter to isolate the transmitter 130 from the receiver 120. The duplex filter combines a transmit-band filter and receiver-band filter to provide the necessary isolation between the two paths.

DSP 150 comprises a digital modem 155 and source coder 160. Source coder 160 includes a speech coder (not shown) for digitizing and coding speech for transmission on the reverse link to the base station 12. Additionally, the speech coder decodes speech signals received from the base station 12 and converts speech signals into audio signals that are output to speaker 194. CDMA systems use an efficient method of speech coding and error recovery techniques to overcome the harsh nature of the radio channel. One speech coding algorithm frequently used in CDMA systems is Code Excited Linear Predictor (CELP) speech coding. Speech is typically encoded at rates of 9.6 kilobits per second or 13.3 kilobits per second. The details of speech coding are not material to the invention and, therefore, are not explained in detail herein.

The digital modem 155 processes digital signals to make communication over the propagation channel more robust. Digital modem 155 includes a digital modulator and at least one demodulator. The digital modulator superimposes the message waveform onto a carrier for radio transmission using algorithms that guard against fading and other impairments of the radio channel while attempting to maximize bandwidth efficiency. Modulator also performs channel coding and encryption if used. The digital demodulator detects and recovers the transmitted message. It tracks the received signal, rejects interference, and extracts the message data from noisy signals. Demodulator 180 also performs synchronization, channel decoding, and decryption if used.

The MCU 101 supervises the operation of the mobile terminal 100 and administers the procedures associated with the communication protocol. The MCU 101 typically comprises a microprocessor, with associated arithmatic logic units, timers, and register files. The MCU 101 implements the communication protocols used by the mobile terminal 100. The communication protocol specifies timing, multiple access approach, modulation format, frame structure, power level, as well as many other aspects of mobile terminal operation. The MCU 101 inserts signaling messages into the transmitted signals and extracts signaling messages from the received signals. MCU 101 acts on signaling messages received from the base station 12 as set forth in the communication protocol. When the user enters commands via the user interface 190, the commands are passed to the MCU 101 for action.

The MCU 101 and DSP 150 use dedicated or shared buses to connect to memory (not shown). Memory is typically segmented into blocks that hold the start-up code, control software, DSP firmware, and temporary data.

The mobile terminal 100 of the present invention implements forward link power control. To briefly summarize, the mobile terminal 100 monitors the signal received on the forward link and compares the received signal to a predetermined channel quality standard. A variety of channel quality estimates may be employed, such as received signal strength (RSSI), frame error rate (FER), bit error rate (BER), signal-to-interference ratio (SIR), or a combination thereof. The goal is to maintain a desired minimum channel quality standard at the lowest possible transmit power level at the base station 12. To meet this goal, the mobile terminal 100 continuously measures the quality of the received signal and determines whether the transmit power should be incremented or decremented. The mobile terminal 100 then transmits power control information to the base station 12 to use in controlling transmit power on the forward link. Typically, power control information is in the form of a power control code called the power control bit (PCB). A PCB having a value of +1 is used to request an increase in transmit power. Conversely, a PCB having a value of −1 is used to request a decrease in transmit power. Thus, the mobile terminal 100 assists the base station 12 to control power on the forward link.

In cdma2000, the PCB is transmitted to the base station 12 on the reverse pilot channel (R-PICH), although power control information could be transmitted on a reverse dedicated control channel (R-DCCH) or reverse traffic control channel (R-TCH). R-PICH comprises the reverse pilot signal and multiplexed forward power control information. The forward power control information, i.e., PCBs, is time-multiplexed with the reverse pilot signal and is referred to as the power control channel. The reverse pilot channel is divided into 20 ms frames. Each R-PICH frame comprises sixteen reverse power control groups. The first ¾ of each power control group (PCG) is used to transmit the reverse pilot signal. The last ¼ of each PCG is used to transmit PCB information. The PCB is updated in each PCG, so sixteen PCBs are transmitted in each 20 ms frame.

According to the present invention, a mobile terminal 100 assigned a quasi-orthogonal code uses forward link power control to compensate for performance degradation associated with the use of quasi-orthogonal codes. As described above, the mobile terminal 100 monitors the signal received on the forward link and transmits PCBs, or other analogous power control codes, to the base station instructing the base station 12 to either increase or decrease the transmit power on the forward link. Thus, the mobile terminal 100 will request power as needed to have the same target SIR as a mobile terminal 100 using a Walsh code. Hence, the performance difference between mobile terminals 100 using quasi-orthogonal codes and Walsh codes will be mitigated.

The use of forward link power control is not as effective in channels that are characterized by a high Doppler frequency. High Doppler frequency is typically associated with high mobility users. Low Doppler frequency is associated with low mobility users. For purposes of this application, the term mobility refers to the mobility of the user relative to the base station. Therefore, in order to optimize performance for all users, the system attempts to assign quasi-orthogonal codes to users with low mobility. It should be noted that quasi-orthogonal codes are normally assigned only when no Walsh codes are available. Thus, Walsh codes are the preferred set of spreading codes and quasi-orthogonal codes are the non-preferred set of spreading codes. If Walsh codes are available, the new user will be assigned one of the available Walsh codes. However, if all Walsh codes are currently being used, the user will be assigned either a quasi-orthogonal code or one of the currently assigned Walsh codes, depending on the Doppler frequency of the forward propagation channel used by that user. The base station 12 may estimate the Doppler frequency on the forward propagation channel based on the Doppler frequency of the reverse propagation channel, since the Doppler frequency on the forward and reverse channels are almost always the same. If the new user has a low Doppler frequency, the user is assigned a quasi-orthogonal code. On the other hand, if the new user has a high Doppler frequency, the base station 12 reassigns a current Walsh code user to a quasi-orthogonal code and then assigns the newly-available Walsh code to the new user. The determination whether to assign a Walsh code or quasi-orthogonal code to a new user can be made based on comparison of the Doppler frequency to a predetermined threshold for the Doppler frequency. If the Doppler frequency is less than the threshold, the user is assigned a quasi-orthogonal code. Conversely, if the Doppler frequency is greater than the threshold, the new user is assigned a Walsh code.

Once the spreading codes are assigned, all users with low mobility may implement fast forward power control. The users with low mobility may include both Walsh code users and quasi-orthogonal code users. Users with high mobility and, therefore, a high Doppler frequency may disable fast forward power control since it is not as effective at high mobility. The base station 12 may continue to monitor the Doppler frequency for all users and continuously reassign spreading codes as circumstances dictate. Thus, when a quasi-orthogonal code user changes from low mobility to high mobility, the base station 12 may reassign that user to a Walsh code. If all Walsh codes are in use, the base station 12 may assign a low mobility Walsh code user to a quasi-orthogonal code to make that Walsh code available. In general, the overall objective is to assign all Walsh codes first and then to assign quasi-orthogonal codes to low mobility users that can benefit from forward link power control.

Figure 4:
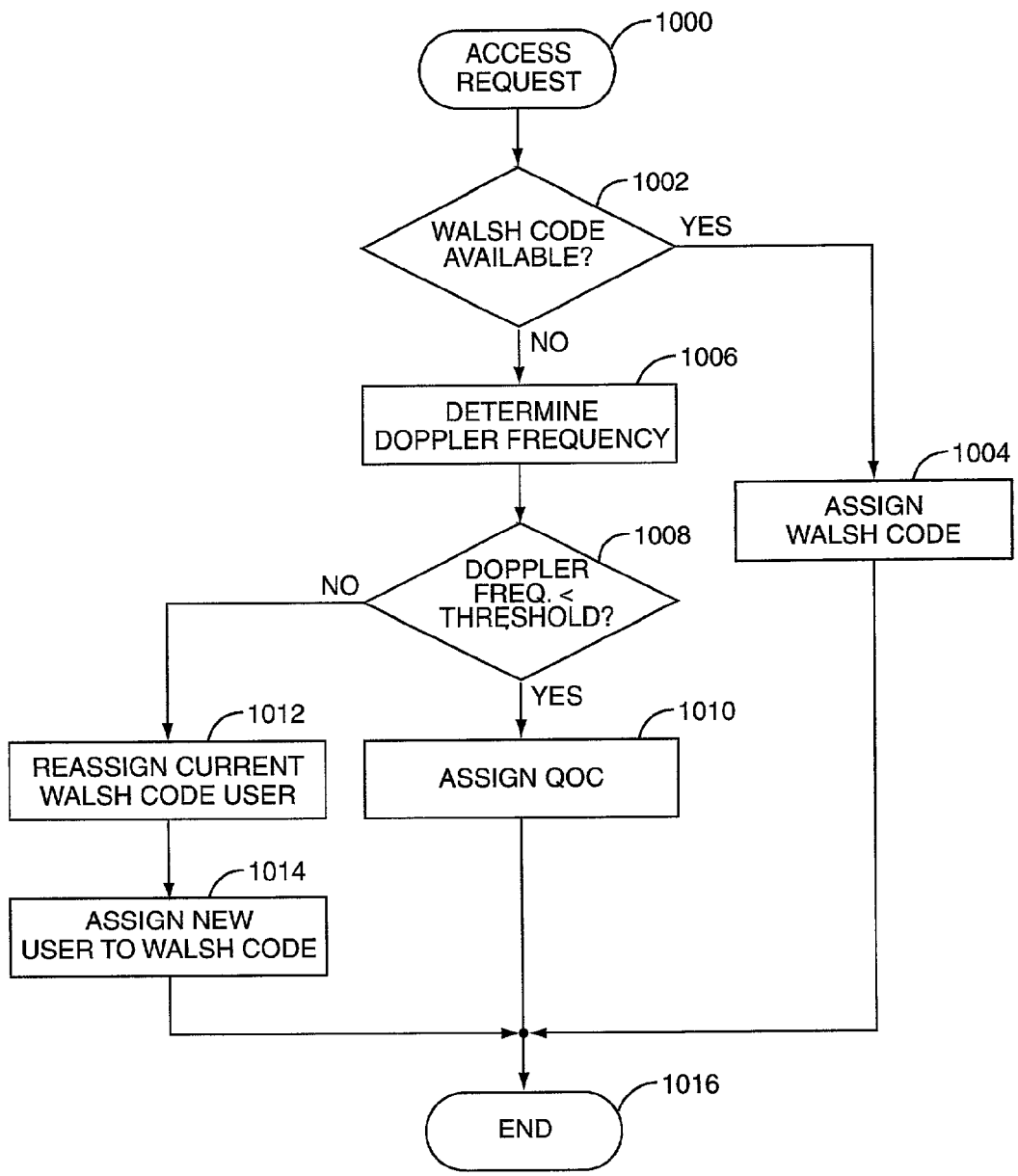
FIG. 4 is a flow diagram illustrating a channel allocation procedure implemented by the base station to assign spreading codes to users.

FIG. 4 illustrates a method implemented in a base station for assigning spreading codes (e.g., Walsh codes and quasi-orthogonal codes) to users. A mobile terminal 100 requests access at block 1000. At block 1002, the base station 12 determines whether any Walsh codes are available. If so, the new user is assigned to a Walsh code (block 1004) and the procedure ends (block 1016). If no Walsh codes are available, the base station 12 determines the Doppler frequency of the forward propagation channel (block 1006) in use by the new user and then compares the measured Doppler frequency to the frequency threshold (block 1008). If the measured Doppler frequency is less than the threshold, the new user is assigned a quasi-orthogonal code (block 1010) and the procedure ends (block 1016). If the measured Doppler frequency is greater than the threshold, the base station 12 reassigns a current Walsh code user to a quasi-orthogonal code (block 1012) and then assigns the new user to the newly available Walsh code (block 1014). At block 1012, the base station 12 should attempt to reassign a low mobility Walsh code user, if one is available, to a quasi-orthogonal code. If not, the base station 12 may simply assign the new user to a quasi-orthogonal code since no benefit is gained by reassigning an existing high mobility user to a quasi-orthogonal code.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A channel allocation method for a CDMA communications network comprising:
    establishing a preferred group of spreading codes and a non-preferred group of spreading codes;
    determining a Doppler frequency of a user of said CDMA communications network; and
    assigning said user a spreading code selected from one of said preferred group of spreading codes and said non-preferred group of spreading codes based on said user's Doppler frequency.

2. The channel allocation method of claim 1 wherein determining said Doppler frequency of said user of said CDMA communications network comprises determining a Doppler frequency of a channel used by said user.

3. The channel allocation method of claim 2 wherein assigning said user a spreading code comprises assigning said user a spreading code selected from said non-preferred set of spreading codes based on said Doppler frequency.

4. The channel allocation method of claim 3 wherein assigning said user a spreading code selected from said non-preferred set of spreading codes based on said Doppler frequency comprises assigning a non-preferred spreading code to said user if said Doppler frequency is less than a predetermined threshold.

5. The channel allocation method of claim 2 wherein assigning said user a spreading code comprises assigning said user a spreading code selected from said preferred set of spreading codes based on said Doppler frequency.

6. The channel allocation method of claim 5 wherein assigning said user a spreading code selected from said preferred set of spreading codes based on said Doppler frequency comprises assigning a preferred spreading code to said user if said Doppler frequency exceeds a predetermined threshold.

7. The channel allocation method of claim 1 further comprising reassigning a user originally assigned a spreading code selected from one of said preferred and non-preferred groups of spreading codes to a spreading code selected from the other of said preferred and non-preferred groups of spreading codes.

8. The channel allocation method of claim 7 wherein reassigning a user comprises reassigning a user originally assigned to a spreading code selected from said non-preferred set of spreading codes to a spreading code selected from said preferred set of spreading codes if a spreading code from said preferred set of spreading codes is available.

9. The channel allocation method of claim 7 wherein reassigning a user comprises reassigning a user originally assigned to a spreading code selected from said preferred set of spreading codes to a spreading code selected from said non-preferred set of spreading codes to make said preferred spreading code available to another user.

10. A base station in a CDMA communications network comprising:
    a base transceiver system comprising at least one transceiver for communicating with mobile terminal; and
    a base station controller configured to establish a preferred group of spreading codes and a non-preferred group of spreading codes and to assign spreading codes selected from one of said preferred and non-preferred groups of spreading codes to users of said CDMA communications network, wherein said base station controller is operative to determine a Doppler frequency of users of said CDMA communications network, and to assign a spreading code selected from at least one of said preferred and non-preferred groups of spreading codes to at least one of said users based on said at least one user's Doppler frequency.

11. The base station according to claim 10 wherein said base station controller determines said Doppler frequency of said users by determining a Doppler frequency of channels used by said users.

12. The base station according to claim 11 wherein said base station controller assigns spreading codes selected from said set of non-preferred spreading codes to selected users where said Doppler frequency meets predetermined conditions.

13. The base station according to claim 12 wherein said base station controller assigns spreading codes selected from said set of non-preferred spreading codes to selected users where said Doppler frequency is less than a predetermined threshold Doppler frequency.

14. The base station according to claim 13 wherein said base station controller assigns spreading codes selected from said set of preferred spreading codes to selected users where said Doppler frequency fails to meet said predetermined conditions.

15. The base station according to claim 14 wherein said base station controller assigns spreading codes selected from said set of preferred spreading codes to selected users where said Doppler frequency is greater than said predetermined threshold Doppler frequency.

16. The base station of claim 10 where said base station controller is further operative to reassign users originally assigned a spreading code selected from one of said preferred and non-preferred groups of spreading codes to a spreading code selected from the other of said preferred and non-preferred groups of spreading codes.

17. The base station of claim 16 where said base station controller is further operative to reassign users originally assigned to spreading codes selected from said non-preferred set of spreading codes to spreading codes selected from said preferred set of spreading codes when spreading codes from said preferred set of spreading codes are available.

18. The base station of claim 16 where said base station controller is further operative to reassign users originally assigned spreading codes selected from said preferred set of spreading codes to a spreading code selected from said non-preferred set of spreading codes to make said preferred spreading code available to another user.

19. A method of managing channels in use by one or more mobile terminals in a CDMA communications system, said method comprising:
    establishing a preferred set of spreading codes and a non-preferred set of spreading codes;
    assigning users to at least one spreading code selected from said preferred set of spreading codes if available; and
    assigning selected users to at least one spreading code selected from said non-preferred set of spreading codes when a demand for spreading codes exceeds the number of spreading codes in said preferred set of spreading codes, wherein said suers assigned non-preferred spreading codes are selected base on a Doppler frequency of said users.

20. The method of claim 19 further comprising determining Doppler frequency of users by determining a Doppler frequency of channels used by said users.

21. The method of claim 20 wherein assigning selected users to at least one spreading code selected from said non-preferred set of spreading codes when the demand for spreading codes exceeds the number of spreading codes in said preferred set of spreading codes comprises selecting users assigned to said non-preferred spreading codes based on said Doppler frequency.

22. The method of claim 19 further comprising reassigning users originally assigned to a non-preferred spreading code to a preferred spreading code if a spreading code from said preferred set of spreading codes is available.

23. The method of claim 19 further comprising reassigning a user originally as signed to a preferred spreading code to a non-preferred spreading code to make said preferred spreading code available to a new user.

* * * * *

UNITED STATES PATENT AND TRADEMARK OFFICE
CERTIFICATE OF CORRECTION

PATENT NO. : 7,133,353 B2
APPLICATION NO. : 09/756503
DATED : November 7, 2006
INVENTOR(S) : Sourour et al.

It is certified that error appears in the above-identified patent and that said Letters Patent is hereby corrected as shown below:

Column 10, Line 22
  "suers", should be -- users --;

Column 10, Line 23
  "base", should be -- based --.

Signed and Sealed this

Twenty-second Day of May, 2007

JON W. DUDAS
*Director of the United States Patent and Trademark Office*